(12) United States Patent
Whiting

(10) Patent No.: US 6,439,834 B1
(45) Date of Patent: Aug. 27, 2002

(54) OIL FIELD TOOL

(76) Inventor: Arthur Whiting, 9527 Sagebend La., Houston, TX (US) 77089

( * ) Notice: Subject to any disclaimer, the term of this patent is extended or adjusted under 35 U.S.C. 154(b) by 0 days.

(21) Appl. No.: 09/624,422

(22) Filed: Jul. 24, 2000

Related U.S. Application Data

(63) Continuation-in-part of application No. 09/170,599, filed on Oct. 13, 1998.

(51) Int. Cl.[7] ................................................ F01D 5/00
(52) U.S. Cl. .......................... 415/75; 415/72; 416/176; 416/177; 175/107
(58) Field of Search ...................... 418/48, 152; 384/98, 384/125, 298, 238; 175/107; 415/75, 72; 416/176, 177

(56) References Cited

U.S. PATENT DOCUMENTS

| | | | | |
|---|---|---|---|---|
| 3,023,059 A | * | 2/1962 | Kirk ............................ | 384/291 |
| 3,131,979 A | * | 5/1964 | Shobert ....................... | 384/298 |
| 3,582,166 A | * | 6/1971 | Reising ....................... | 308/238 |
| 3,637,273 A | * | 1/1972 | Orndorff, Jr. ................ | 308/238 |
| 3,693,842 A | * | 9/1972 | Cozzarin et al. .............. | 415/72 |
| 3,728,049 A | * | 4/1973 | Miller, Jr. .................... | 415/72 |
| 3,822,972 A | * | 7/1974 | Ogly et al. ................... | 418/48 |
| 3,857,654 A | * | 12/1974 | Streicher .................... | 418/48 |
| 3,864,197 A | * | 2/1975 | Shobert ....................... | 308/173 |
| 3,912,426 A | * | 10/1975 | Tschirky ...................... | 418/48 |
| 3,932,004 A | * | 1/1976 | Orndorff, Jr. ................ | 308/238 |
| 3,976,453 A | * | 8/1976 | Brown ........................ | 415/178 |
| 3,982,858 A | * | 9/1976 | Tschirky ...................... | 418/48 |
| 3,982,859 A | * | 9/1976 | Tschirky et al. .............. | 418/48 |
| 4,669,555 A | * | 6/1987 | Petree .......................... | 418/48 |
| 4,676,725 A | * | 6/1987 | Eppink ........................ | 418/48 |
| 4,725,151 A | * | 2/1988 | Orndorff, Jr. ................. | 384/98 |
| 5,662,180 A | * | 9/1997 | Coffman et al. .............. | 175/57 |
| 5,816,700 A | * | 10/1998 | Starke, Sr. et al. ......... | 366/147 |
| 5,832,604 A | * | 11/1998 | Johnson et al. ........ | 29/888.023 |

FOREIGN PATENT DOCUMENTS

| | | | | |
|---|---|---|---|---|
| DE | 2258135 A | * | 6/1973 | ................... 418/48 |
| DE | 2713468 A | * | 9/1978 | ................... 418/48 |
| GB | 400508 A | * | 10/1933 | ................... 418/48 |
| GB | 622583 A | * | 5/1949 | ................... 418/48 |

* cited by examiner

Primary Examiner—Thomas Denion
Assistant Examiner—Theresa Trieu
(74) Attorney, Agent, or Firm—Kajane McManus

(57) ABSTRACT

The oil field tool motor is particularly suited for use in the oil well shaft environment wherein the temperature within the shaft can climb to nearly 400° F. and wherein the temperature within the motor can drop to nearly −400° F. when liquid nitrogen is intermittently fed therethrough. The motor incorporates a stator sleeve and guide bearings wherein rubber elements thereof, which cause seizure of the motor due to swelling of the rubber against rotating structures therewithin caused by the high ambient temperature and by impregnation by the liquid nitrogen, are replaced with identically sized and configured elements made of a material having a suitable level of lubricity, which material does not interact chemically with or absorb the nitrogen, and the physical characteristics of which are only minimally affected, if at all, by the ambient temperatures, eliminating seizure of the motor under these conditions of use.

10 Claims, 1 Drawing Sheet

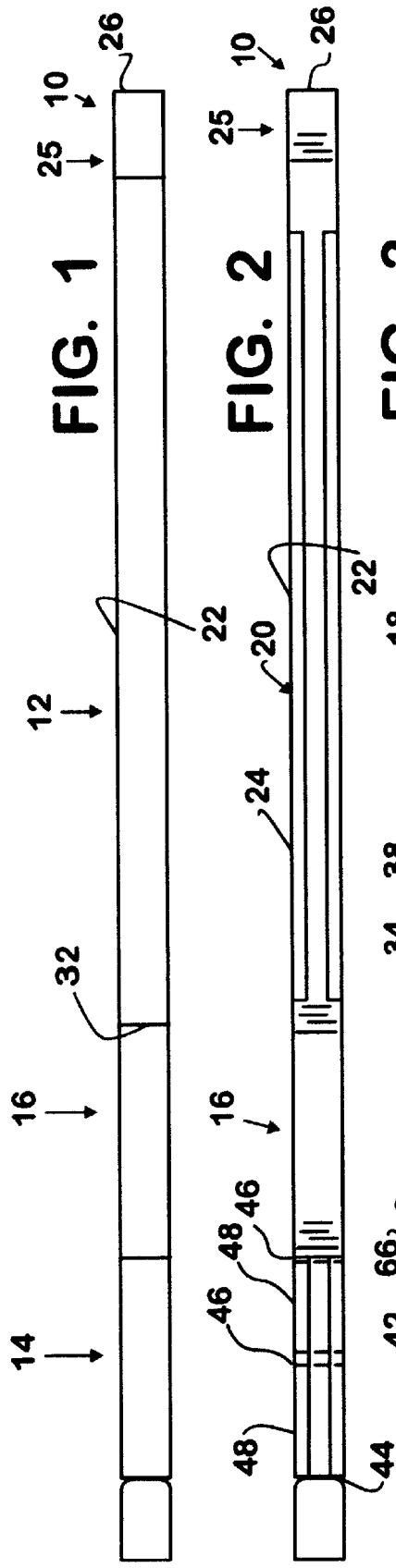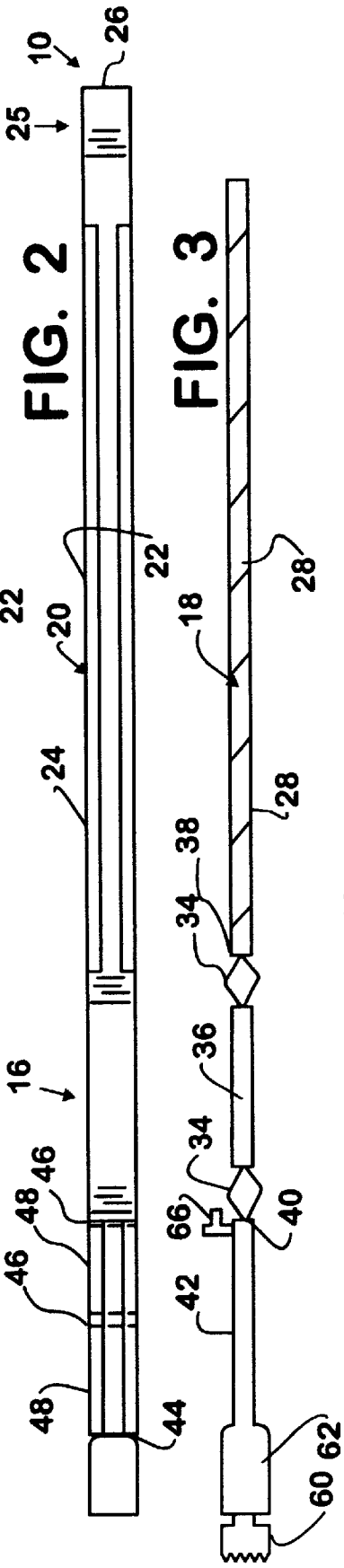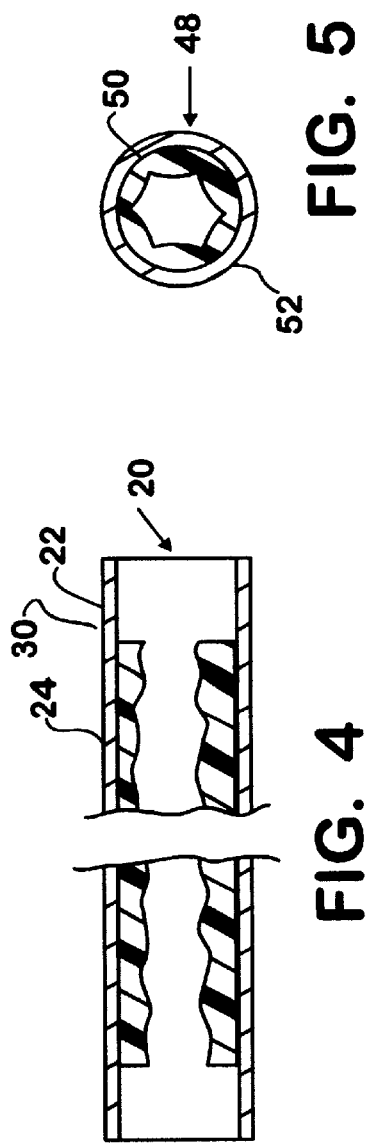

OIL FIELD TOOL

CROSS REFERENCE TO RELATED APPLICATIONS

This application is a continuation-in-part of U.S. application Ser. No. 09/170,599 filed Oct. 13, 1998 entitled Positive Displacement Motor.

BACKGROUND OF THE INVENTION

1. Field of the Invention

The present invention relates to an oil field tool which has been improved for a particular application in the oil field environment, where it is commonly referred to as a "downhole" motor. More specifically, a hydraulic motor of the tool incorporates a novel stator sleeve and guide bearings which eliminate distortion of the material thereof due to effects of the working environment when the tool is used within the shaft of a well, eliminating seizure of the motor during such use.

2. Prior Art

Heretofore the motor of the oil field tool has included a stator having a rubber sleeve therein within which a rotatable shaft called a rotor rotates, and guide bearings incorporating a rubber material insert therein for guiding a rotating drive shaft of a mill which is driven by the rotor. When such tool is used within a well shaft, because temperatures therein may reach almost 400° F., the rubber of the sleeve and bearings inherently deforms, swelling against and around the rotating structures therewithin, causing the motor to seize.

Also, at times, the sleeve and bearings are simultaneously subjected to extremely low temperatures and chemical reactants, such as, for example, when liquid nitrogen is pumped through the tool for use in causing ejection of material blocking a well, such as a paraffin buildup which is broken apart by the tool, via the well shaft, with the rubber swelling further under these conditions by impregnation of the nitrogen thereinto.

Further, during repair of such seized motor, such a degree of pressure is needed to release a shaft from its entrapment within the rubber, that the shaft is often bent, requiring the purchase of a new shaft, each such shaft having a replacement price of $1500.00 or more.

Thus, there exists a need for bearings and a stator sleeve for the motor which will not be affected by ambient conditions of the working environment.

SUMMARY OF THE INVENTION

Accordingly, it is a primary object of the invention to provide an improved oil field tool which will not seize when subjected to ambient conditions of use within the shaft of a well.

This object, as well as others, is met by the oil field tool of the present invention wherein an inner sleeve of a stator and an insert of guide bearings for a mill drive shaft of the tool motor are made of a material such as a polymer which is not compromised in its chemical or physical characteristics over a temperature range of approximately 800° F., or by contact thereof with liquid nitrogen.

BRIEF DESCRIPTION OF THE DRAWINGS

FIG. 1 is a perspective view of an oil field tool suitable for use in "downhole" oil well applications, the motor of the tool incorporating an improved stator sleeve and guide bearings for a mill drive shaft made in accordance with the teachings of the present invention.

FIG. 2 is a longitudinal cross sectional view of the interior of the shell of the tool motor of FIG. 1.

FIG. 3 is a perspective view of structures of the tool motor which extend through the interior of the shell and create the drive train thereof.

FIG. 4 is a longitudinal cross sectional view through the stator incorporating the improved sleeve.

FIG. 5 is a radial cross sectional view through the improved bearing.

DESCRIPTION OF THE PREFERRED EMBODIMENT

Referring now to FIG. 1 in greater detail there is illustrated therein an hydraulic motor of an oil field tool made in accordance with the teachings of the present invention and generally identified by the reference numeral 10.

The motor 10, as is known, includes a power section 12, a bearing section 14, and a bent or flex housing 16 intermediate the sections 12 and 14.

The power section 12 comprises a rotor 18 which is rotatably mounted within a stator 20, with the rotor 18 and a shell 22 of the stator 20 preferably being made of a heat dissipating metal. The stator 20 further includes an inner sleeve 24 which has heretofore been made of rubber.

Rotation of the rotor 18 is produced by the forcing of an appropriate pressurized fluid into and through the stator 20 via a crossover sub or connector 25, at a proximal end 26 of the motor 10, with travel of the fluid through the motor 10 causing operation thereof.

As best illustrated in FIG. 4, the inner sleeve 24 of the stator 20 is pressed against an inner surface 30 of the shell 22 and is configured to accommodate a helical outer surface 28 of the rotor 18 in a manner to allow passage of pressurized fluid therebetween, with action of the fluid upon and against the helical outer surface 28 of the rotor 18 causing rotation thereof.

The pressurized fluid then passes through the bent or flex housing 16 adjacent a distal end 32 of the stator 20, the bent housing 16 incorporating therein flexible end joints 34 engaged to an intermediate shaft 36. A proximal end joint 34 engages the shaft 36 to a distal end 38 of the rotor 18 while a distal end joint 34 engages shaft 36 to a proximal end 40 of a bit box drive shaft 42 at a distal end 44 of the motor 10. Such configuration is desired for assuring a degree of longitudinal flexibility for the motor 10.

The pressurized fluid then enters and passes through the bearing section 14 within which are positioned a series of bearings, some of which are of a ball type 46 and others of which are of a guide type 48, with the fluid finally exiting the motor 10 at the distal end 44 thereof.

It will be understood that the bearings 46 and 48 are necessary to accommodate rotation of the bit box drive shaft 42, driven by the rotor 18 through the various defined linkages within the flex housing 16. The ball type bearings 46 are made of a metal, with an inner race thereof (not shown) spinning with the rotating drive shaft 42, in known manner.

The guide bearings 48, on the other hand, are provided to assure rotational alignment of the drive shaft 42 relative to that of the rotor 18, and are required because of the provision of the flexible end joints 34. Typically, the guide bearings 48 are embodied as an elongate cylindrical metal shell 50, preferably made of brass, which is lined with a thick, splined insert 52, presently molded of rubber.

As is understood, the oil field tool motor 10 has been found to have application in the oil well shaft environment. In this respect, it is known that such oil field tool motors 10 are used in the completion of gas and oil wells, drilling out plugs of concrete, metal and rubber inserts which are set to separate zones of gas and oil pockets at varied depths within the well shaft. Further, they are at times used to drill the shaft of the well itself. Still further, they are used in reentering a well, drilling through sand, paraffin, or any other substance blocking flow of natural gas or oil to the surface.

It is known that ambient temperatures within a shaft of a well may approach a level of 400° F. At such elevated temperatures, the typically rubber insert 52 of each bearing 48, as well as the rubber inner sleeve of the stator 20, deform and swell inwardly, against the drive shaft 42 and rotor 18, the swelling being of such an extent as to cause interference with rotation of the shaft 42 and helical rotor 18 therewithin.

The pressurized drive fluid passing through the motor 10 does not cause any significant cooling of the swollen rubber structures, with the motor 10 eventually seizing when the shaft 42 and rotor 18 are entrapped by the swelling rubber.

Further, when it is desired to eliminate a blockage, such as a paraffin layer, a mill bit 60 is engaged to a terminal bit box 62 of the drive shaft 42 and is used to break up the paraffin layer. At the same time, it is necessary to blow the paraffin up and out of the well via the shaft thereof, with liquid nitrogen being the fluid of choice for efficiently accomplishing this goal. 800° F.

Through empirical testing, it has so far been found that at least one material is particularly well adapted for use in this environment, the material being polytetrafluoroethylene, commonly sold under the mark Teflon. When substituted in place of the rubber, even with the high ambient temperatures and the intermittent nitrogen environment, seizure of the motor 10 is virtually eliminated, decreasing downtime and costs of well maintenance significantly.

It will be understood also, that the sleeve 24 and bearing inserts 52 made in accordance with the teachings herein do not exist, sized and configured for application in this particular motor 10, so that prototypes of Teflon have had to be specially made for testing to date.

Although not yet tested, it is assumed that several embodiments of polymers other then polytetrafluoroethylene, such as silicone, or those sold under the respective marks Viton, Kalrez, Buna, etc. having characteristics in the range of those desirable in this application could also be substituted in place of the rubber. Accordingly, the use of polytetrafluoroethylene in the preferred embodiment disclosed should not be construed as limiting.

As described above the improved oil field tool motor 10 of the present invention provides a number of advantages, some of which have been described above and others of which are inherent in the invention. Also, modifications may be proposed to the motor 10 without departing from the teachings herein. Accordingly, the Liquid nitrogen exists at a temperature of around –400° F. and is supplied into the motor 10 via a flow sub or secondary connector 66 positioned near the flex housing 16 and feeding into and distally through the motor 10 via the drive fluid path.

As the liquid nitrogen flows, the interior temperature of the motor 10 not only drastically drops almost 800° F., but the heat deformed and already swollen rubber of the inner sleeve 24 of the stator 20 and bearing insert 52 becomes even more swollen against the respective interior rotational structures, due to impregnation of the rubber by the nitrogen.

In fact, seizing of the rubber against the structures interior thereof is of such an extreme nature that extreme force must be applied to accomplish their separation, with the required force often bending the shaft 42 and/or rotor 18, rendering same useless with the cost of replacement being excessive, rising well above $1500.00 per structure, with no other alternative being available to date.

To avoid seizure of the motor 10 and replacement of structures entrained within the rubber, it is proposed herein to improve the oil field tool motor 10 by replacing the rubber of the inner sleeve 24 of the stator 20 and of the insert 52 of the guide bearings 48, with a material having a desired level of lubricity, which material does not interact chemically with or absorb the liquid nitrogen, and the physical characteristics of which are not compromised to any significant degree over the entire potential operating temperature range across the structures 24 and 52, of approximately scope of the invention is only to be limited as necessitated by the accompanying claims.

I claim:

1. An improved oil field tool including a hydraulic motor particularly adapted for use in an oil well shaft environment wherein the motor is also adapted for use in injection of liquid nitrogen, when desired, into the well via the shaft thereof, the motor incorporating at least a shell, a hydraulically driven rotor having a helical outer surface within the shell, the shell including an inner sleeve sized and configured to allow rotor rotation therewithin, and a bit box drive shaft which is functionally engaged to and driven by the rotor, the drive shaft being seated at least within guide bearings, the improvement comprising creation of the inner sleeve and an insert of the drive shaft guide bearings, having an appropriate size and configuration, of a material having a predefined level of lubricity, the material also being chemically inert and non-absorptive with respect to liquid nitrogen, and wherein physical characteristics of the material remain stable over a temperature range extending across the material from approximately 500° F. to approximately –500° F.

2. The motor of claim 1 wherein the material is a polymer.

3. The motor of claim 2 wherein the polymer is polytetrafluoroethylene.

4. The motor of claim 2 wherein the polymer is silicone.

5. The motor of claim 2 wherein the polymer is a material sold under the mark Kalrez.

6. The motor of claim 2 wherein the polymer is a material sold under the mark Viton.

7. The motor of claim 2 wherein the polymer is a material sold under the mark Buna.

8. The motor of claim 7 wherein the material is a polymer.

9. In an oil field tool motor incorporating a hydraulic rotating drive train nested within a shell and including at least one guide bearing and an inner sleeve on the shell, through each of which the drive train passes, the motor also being adapted for intermittent passage of liquid nitrogen under pressure therethrough, when desired, along at least a portion thereof, the improvement comprising creation of the inner sleeve and an insert of the bearing from a material having a predefined level of lubricity, the material being chemically inert and non-absorptive with respect to liquid nitrogen, and wherein physical characteristics of the material remain stable over a temperature range thereacross extending from approximately 500° F. to approximately –500° F.

10. The motor of claim 8 wherein the polymer is any one selected from a group comprising silicone, a material sold under the mark Teflon, a material sold under the mark Kalrez, a material sold under the mark Viton, and a material sold under the mark Buna.

* * * * *